United States Patent [19]

Zibrik et al.

[11] Patent Number: 5,138,328
[45] Date of Patent: Aug. 11, 1992

[54] INTEGRAL DIVERSITY ANTENNA FOR A LAPTOP COMPUTER

[75] Inventors: Larry Zibrik; Ronald J. Vanderhelm, both of Richmond; Robert W. Hamilton, Tsawwassen, all of Canada; Oscar Garay, Coral Springs, Fla.

[73] Assignee: Motorola, Inc., Schaumburg, Ill.

[21] Appl. No.: 748,611

[22] Filed: Aug. 22, 1991

[51] Int. Cl.$^5$ ............................................. H01Q 1/24
[52] U.S. Cl. ......................................... 343/702; 343/846
[58] Field of Search ............... 343/702, 834, 845, 846; 455/89, 351

[56] References Cited

U.S. PATENT DOCUMENTS

| | | | |
|---|---|---|---|
| 4,494,120 | 1/1985 | Garay | 343/702 |
| 4,584,585 | 4/1986 | Marko et al. | 343/702 |
| 4,584,709 | 4/1986 | Kneisel et al. | 455/78 |
| 4,849,765 | 7/1989 | Marko | 343/702 |

*Primary Examiner*—John D. Lee
*Assistant Examiner*—Robert E. Wise
*Attorney, Agent, or Firm*—Donald B. Southard

[57] ABSTRACT

An integral diversity antenna especially suited for use in a laptop computer device without the need for changing or otherwise altering such devices pre-established form factor. Two separately located printed circuit board antenna structures are orthogonally mounted in an associated counterpoise. One such antenna structure is vertically polarized and the other horizontally polarized. In this manner, both spatial and polarization diversity is achieved. The counterpoise serves the additional purpose of affecting both RFI and EMI shielding of the laptop computer's LCD display and driven circuitry.

6 Claims, 3 Drawing Sheets

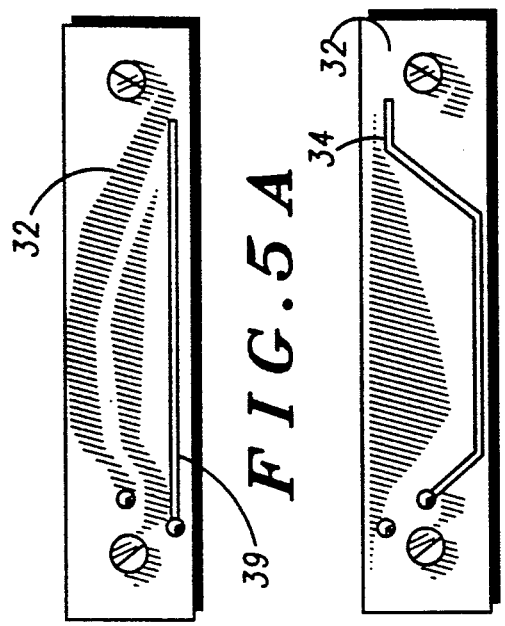
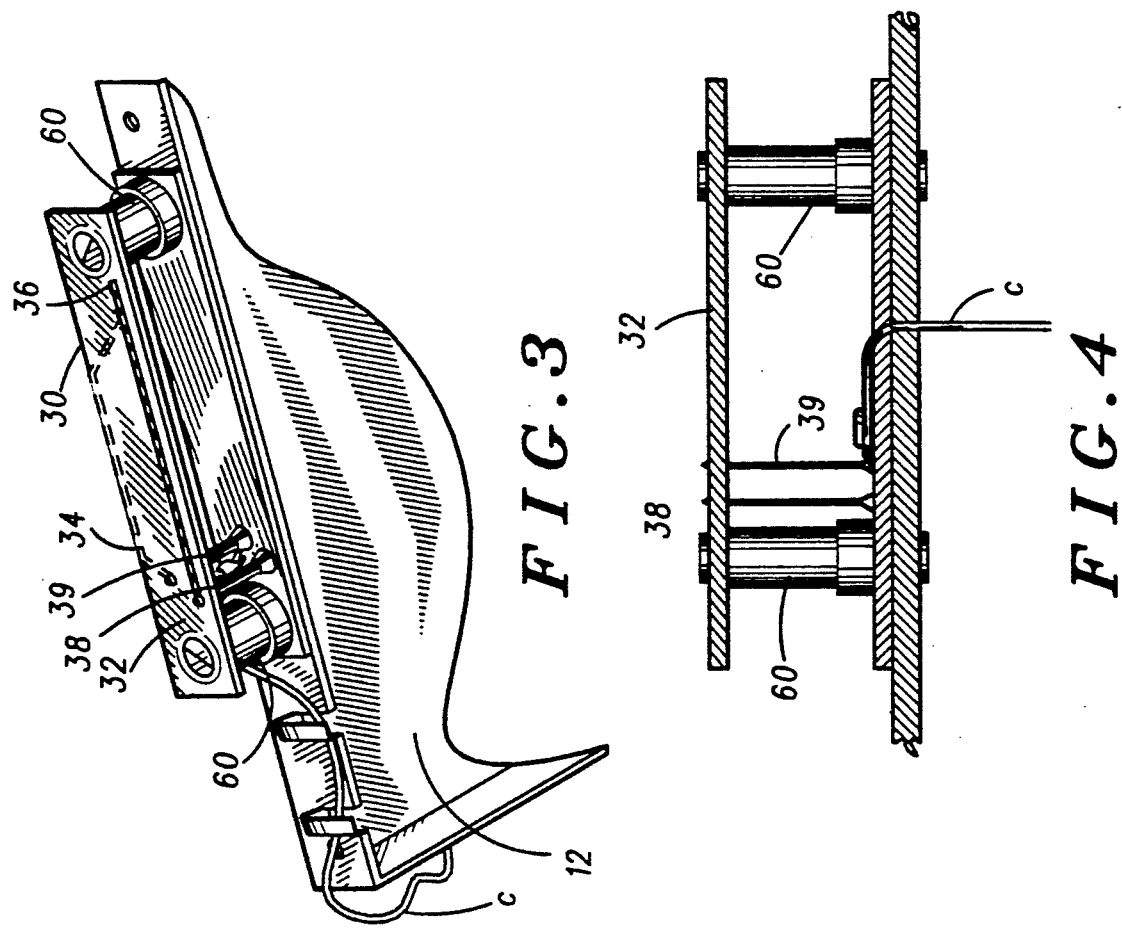

5,138,328

INTEGRAL DIVERSITY ANTENNA FOR A LAPTOP COMPUTER

FIELD OF THE INVENTION

The present invention relates generally to antenna structures and more particularly to a diversity antenna configuration which successfully integrates into a laptop computer without altering the form factor for such computer device.

With the advent of modern day technology, complexity is ever increasing and size/volume is continually being reduced or otherwise compacted. This applies with particular vigor and emphasis in the radio communications art. Not only must new circuitry and signalling processing innovations be effected with each new product design to meet competition pressures, but the added problem of effectively transmitting and receiving data and other signal information merely exacerbates the encountered problems, given the severe limits on permitted volume dimensions.

With radio communication apparatus, the above-referenced problem of transmission and reception is not nearly as severe as may be encountered in other applications. This is principally because the antenna structure may be located outside the housing. Vertical antennas on portable two-way radio communications devices, by way of example, merely extend upwardly to the extent needed. The same, however, may not usually be made readily available for other devices such as portable data terminals. The added design requirement that they must be placed internally of the housing is very restrictive. While this design challenge has been approached in various ways, and in some instances, adequately met, there is lacking, nevertheless, adequate solutions for many product applications.

One such application, to which the present invention is addressed, is the area of laptop computers. The whole idea of a laptop computer terminal is to provide full desk-top computer terminal capability into a downsized version wherein space and weight parameters are but a fraction of the former. In the past, these laptop computers were normally disconnectable from the main computer and were, for the most part, intended to essentially store data inputed by keyboard until such time as the terminals are able to communicate by coaxial cable from a suitable output port to a main computer or the like.

Currently, the demand has been imposed that such laptop computer terminals be capable of continuous communication with its host computer. This requires a RF link in lieu of cabling. The transmitting/receiving capability must be added in the already designed form factor of the laptop computer device itself. And, for various reasons, the antenna structure which effects the necessary RF linking must be situated internal of these devices and without altering (increasing the volume) of the already established form factor of such devices. Moreover, the antenna configuration so incorporated in the referenced laptop computer terminal device must offer not only diversity of reception, but have a polarization diversity capability, as well as providing a shielding action for the LCD display and driver circuitry including in the top or lid portion of the terminal. Lastly, but not less importantly, the antenna structure must be designed to avoid or otherwise reduce the effects of proximity to human operators and various metallic or conducting resting surfaces on which the laptop terminal device may be placed.

SUMMARY OF THE INVENTION

Accordingly, in practicing the invention, a low-profile, integral diversity antenna arrangement is provided which is especially adapted for use in, and to provide RF modem capability for, a laptop computer terminal device having an associated liquid crystal display which antenna arrangement includes an integral counterpoise and electro-magnetic shielding structure adapted for location within the laptop computer without requiring alteration of the computers initial form factor. A pair of printed circuit board based antennas are located from an edge surface of the counterpoise at locations which provide both spatial and polarization diversity for received RF signals and wherein each of the printed circuit board antennas have a printed circuit board with an active, driven element on one side and a passive, parasitic element on the other side in coupled relation thereto. These printed circuit board elements are spaced from the counterpoise surface by essentially a half wave length. In this manner, the counterpoise provides antenna current paths for the requisite polarization diversity while further facilitating mechanical mounting for optimal spatial diversity and wherein the shielding capability thereof provides both RFI and EFI shielding for the associated terminal LCD display.

BRIEF DESCRIPTION OF THE DRAWINGS

The features of the present invention which are believed to be novel are set forth with particularity in the claims appended hereto. The invention, itself, however, together with further objects and advantages thereof may be best understood by reference to the following drawings in which:

FIG. 3 is a partial enlarged view in perspective of one of the printed circuit board antenna structures comprising the present invention;

FIG. 4 is a side view in elevation of the antenna structure of FIG. 3; and

FIGS. 5a and 5b are the top plan views of the printed circuit board antennas of FIGS. 3 and 4.

DETAILED DESCRIPTION OF THE PREFERRED EMBODIMENT

Figure 1:
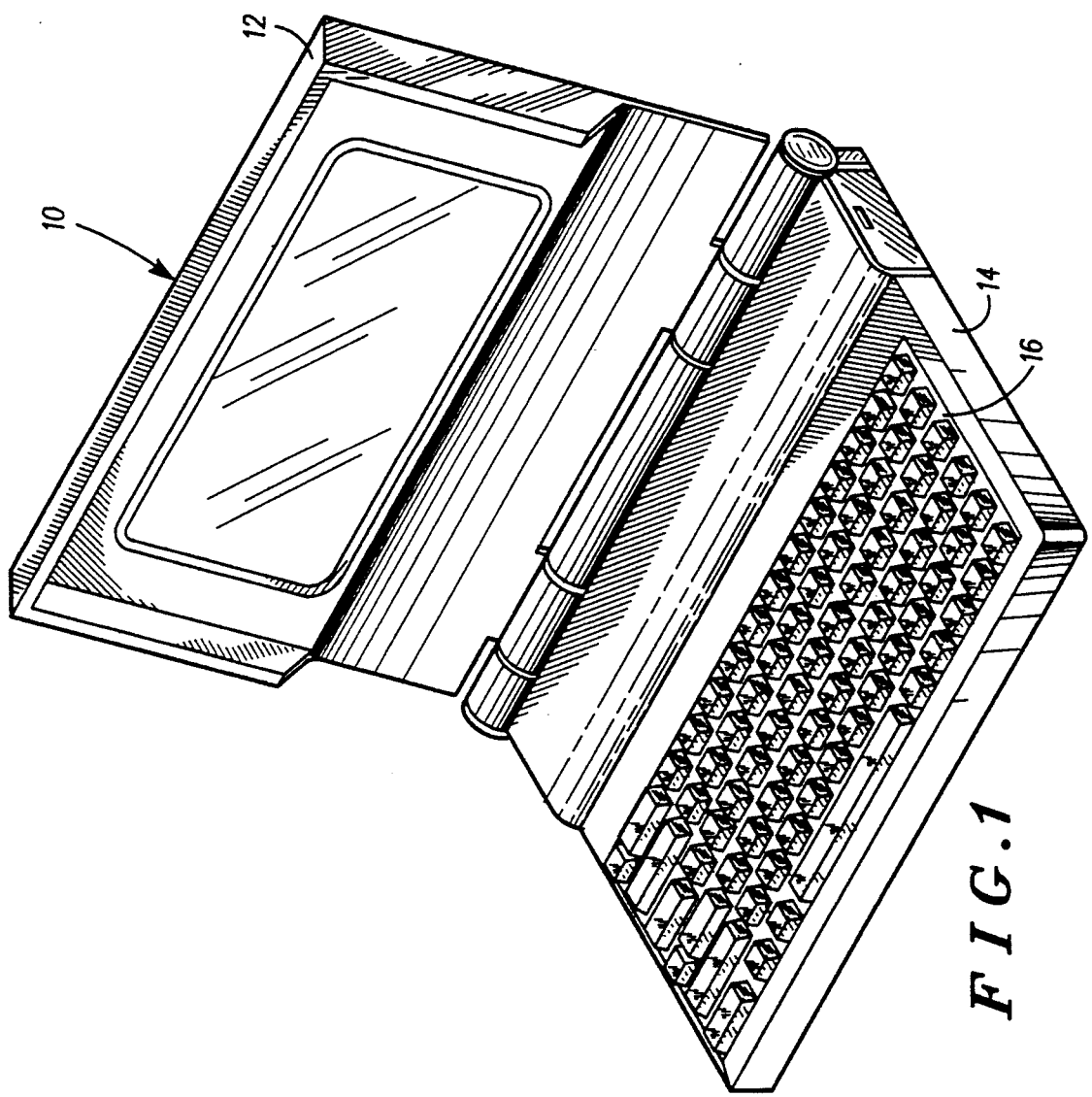
FIG. 1 is a view in perspective of a typical laptop computer device in which the present invention may be advantageously utilized.

Referring now to the drawings, a view in perspective is shown in FIG. 1 of a typical laptop computer device 10, which device may advantageously utilize the antenna arrangement comprising the present invention. As referenced previously, such personal communication devices are complex in nature, but all have the critical need to adapt to a given, predetermined volume of space, internal of the computer device, in which such antenna arrangements must be located. The referenced space in which the associated antenna structures are to be located is usually the top cover 12, since the base portion 14 containing, inter alia, the keyboard 16, must rest on a surface of some sort. The top cover 12, moving upward and away from the base 14, effects both access to the keyboard 16 as well as minimizing the deleterious effects of the resting surface, if such surface is metallic or otherwise conductive.

Figure 2:
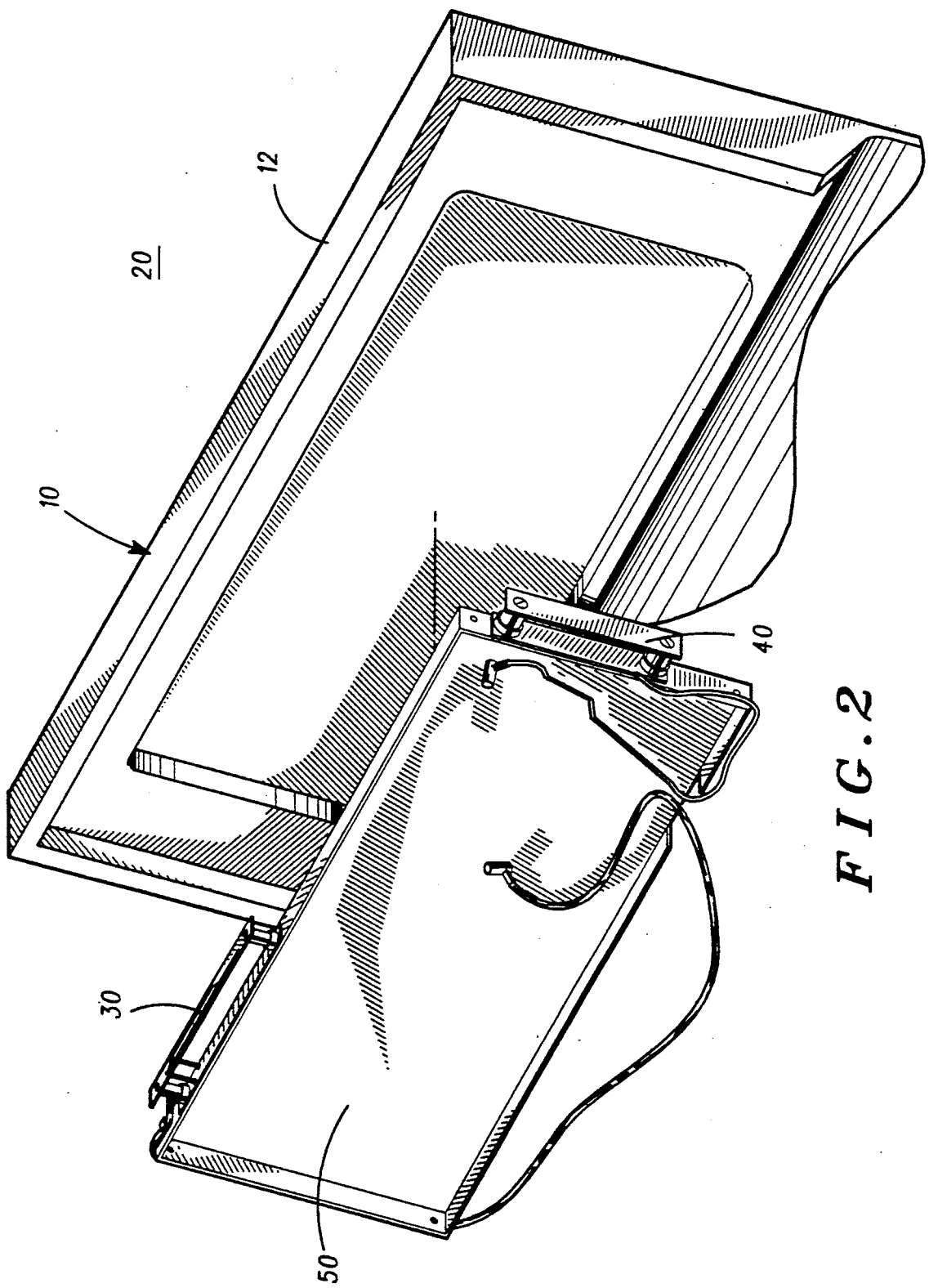
FIG. 2 is a partial enlarged view of the top cover of the laptop computer of FIG. 1 in which the antenna structure of the present invention is located.

FIG. 2 illustrates the antenna structure 20 of the present invention as located within the interior of the top cover 12. Structure 20 comprises a pair of printed circuit board antennas 30 and 40, as mounted to an associated ground plane/counterpoise structure 50. It is to be noted that the two printed circuit board antennas 30 and 40, together with their counterpoise 50, fits into and takes on the specific form factor configuration of the product (in this case, computer device 10).

It will be noted that the two printed circuit board antennas 30 and 40 are orthogonally mounted on the counterpoise 50 and spaced each from the other in a manner to provide both spatial as well as polarization diversity for the reception of RF signals. That is, antenna 30 is, in the arrangement as shown in FIG. 2, intended as the primary antenna. As such, it is vertically polarized and functions in both transmit and receive modes. Its designed frequency range is approximately 806 to 825 mHz and effects approximately 10 db return loss with respect to the associated laptop transmitter (not specifically shown). Antenna 40 may be considered as the secondary antenna and, as such, exhibits much of the operating characteristics effected by primary antenna 30. However, it is designed to radiate in the horizontal plane and needs to function only in the receive mode within the approximate frequency range of 851 to 870 mHz. In any event, it will be readily appreciated that both antennas 30 and 40 are mounted in a position and location which not only gives rise to the desired spatial diversity therebetween but are likewise located so as unlikely to be manipulated by human hands.

The counterpoise 50 itself is designed to provide a multipurpose function. First and foremost, it provides a path for antenna currents in the separate referenced polarizations, thereby achieving the objective of polarization diversity for the antenna structure 20 as a whole. Secondly, counterpoise 50 provides the base for the physical mounting of the associated antennas 30 and 40 as well as their specific spacing one from the other so as to achieve the desired spatial diversity objective. Next, counterpoise 50 is designed with a surface area large enough to cover, that is, tightly fit over the LCD display and driver circuitry (not specifically shown) contained in the top cover 12. As such it provides a shielding action against both potentially undesirable Radio Frequency Interference (RFI) as well as Electromagnetic Interference (EMI).

FIG. 3 shows a representative one of the circuit board antennas (in this case antenna 30) in somewhat more detail. As indicated, antenna 30 includes a printed circuit board 32 on which a driven or active radiator element 34 is positioned on one side thereof, in this case the underside, as viewing FIG. 3. The radiator is cut to a specific dimension so as to provide the desired frequency range. Similarly, a parasitic, passive radiator element 36 is positioned on the opposite side of board 32, in this case, the top surface. It too is cut to a frequency to provide effective operation in the desired frequency range. As indicated, parasitic element 36 has one end connected to the counterpoise (ground) by connective element 38. Similarly, an end of the driven element 34 is connected to a feed point to which a coaxial cable C is also connected, best seen in FIG. 4, by a similar connective element 39. The free or unconnected ends of the radiator elements 34 and 36 overlap to provide a coupling function therebetween and provide the correct impedance match characteristics. The entire printed circuit board antenna arrangement, is then spaced from the counterpoise 50 by approximately a half wave by nonconductive mounting posts 60 of about 12 mm spacing.

It will be understood that printed circuit board 40 is similar in construction as that described for antenna 30. It too is spaced from the counterpoise 50 by approximately 12 mm, which because of its slightly higher operating frequency (851-870 mHz), effects a slightly greater than half wave length spacing.

Accordingly, the present invention provides a highly effective antenna structure especially adapted by inclusion in the internal space of a laptop computer device without the need to change or otherwise alter the initial design form factor of such computer device. Such antenna arrangement includes an associated counterpoise that fits tightly over the computer LCD display and driver circuitry so as to affect advantageous RFI and EMI shielding while at the same time providing the mounting structure for the printed circuit board antennas to provide the desired spatial and polarization diversity characteristics that are deemed significant for effective operation of the computer device itself. The antennas are arranged in a location where they are unlikely to be manipulated by human hands and are at an optimum distance from any metal or conducting surface on which the laptop computer itself may be placed.

Accordingly, what is claimed is:

1. A low-profile, integral diversity antenna arrangement especially adapted for use in, and to provide RF modem capability for, a laptop computer terminal device with a liquid crystal display (LCD), comprising in combination:

integral counterpoise and electro-magnetic shielding means adapted for location within the laptop computer without altering said computer's initial form factor; and a pair of printed circuit board (PCB) based antennas spaced from the surface of said counterpoise at locations which provide both spatial and polarization diversity for received RF signals, each of said PCB based antennas including a printed circuit board having an active, driven element on one side thereof and a passive, parasitic element on the other side in coupled relation thereto, said printed circuit board with mounted elements being spaced from said counterpoise surface by essentially a half wavelength, said counterpoise means providing antenna current paths for said polarization diversity and facilitating mechanical mounting for optimal spatial diversity, with said shielding means providing FRI and EMI shielding for the terminal LCD display.

2. A low-profile, integral diversity antenna arrangement in accordance with claim 1 wherein one of said antennas function as a primary antenna capable of both transmitting and receiving in the 806-825 mHz frequency range and the other of said antennas functioning as a secondary antenna capable of receiving in the 851-870 mHz frequency range.

3. A low-profile, integral diversity antenna arrangement in accordance with claim 2 wherein said primary antenna is positioned to radiate in a vertical plane while said other, secondary antenna is positioned to radiate in a horizontal plane.

4. A low-profile, integral diversity antenna arrangement especially adapted for use in, and to provide RF modem capability for, a laptop computer terminal device with a liquid crystal display (LCD), comprising in combination:

integral counterpoise and electro-magnetic shielding means adapted for location within the laptop computer without altering said computer's initial form factor; and primary and secondary printed circuit board (PCB) based antennas, said primary PCB based antenna being vertically polarized and capable of both transmitting and receiving, with said secondary PCB based antenna being horizontally polarized and intended for receiving only, said PCB based antennas being spaced from the surface of said counterpoise at locations which provide both spatial and polarization diversity for received RF signals, each of said PCB based antennas including a printed circuit board having an active, driven element on one side thereof and a passive, parasitic element on the other side in coupled relation thereto, said printed circuit board with mounted elements being spaced from said counterpoise surface by essentially a half wavelength, said counterpoise means providing antenna current paths for said polarization diversity and facilitating mechanical mounting for optimal spatial diversity, with said shielding means providing RFI and EMI shielding for the terminal LCD display.

5. A low-profile, integral diversity antenna arrangement in accordance with claim 4 wherein said primary antenna is capable of both transmitting and receiving in the 806–825 mHz frequency range and said secondary antenna is capable of receiving in the 851–870 mHz frequency range.

6. A low-profile, integral diversity arrangement in accordance with claim 4 wherein said PCB based antennas are orthogonally mounted on said counterpoise at locations to minimize signal degradation with respect to any metallic and absorption resting surface on which the computer device may be placed.

* * * * *